(12) United States Patent
Chiba et al.

(10) Patent No.: US 11,843,633 B2
(45) Date of Patent: Dec. 12, 2023

(54) ANALYSIS DEVICE, ANALYSIS METHOD, AND ANALYSIS PROGRAM

(71) Applicant: NIPPON TELEGRAPH AND TELEPHONE CORPORATION, Tokyo (JP)

(72) Inventors: Daiki Chiba, Musashino (JP); Mitsuaki Akiyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 555 days.

(21) Appl. No.: 17/261,173

(22) PCT Filed: Apr. 26, 2019

(86) PCT No.: PCT/JP2019/018132
§ 371 (c)(1),
(2) Date: Jan. 19, 2021

(87) PCT Pub. No.: WO2020/021811
PCT Pub. Date: Jan. 30, 2020

(65) Prior Publication Data
US 2021/0279497 A1 Sep. 9, 2021

(30) Foreign Application Priority Data
Jul. 25, 2018 (JP) .................. 2018-139082

(51) Int. Cl.
*G06F 18/22* (2023.01)
*H04L 9/40* (2022.01)
*G06F 21/55* (2013.01)

(52) U.S. Cl.
CPC .......... *H04L 63/1483* (2013.01); *G06F 18/22* (2023.01); *G06F 21/552* (2013.01); *G06F 2221/2119* (2013.01)

(58) Field of Classification Search
CPC ... H04L 63/1483; G06F 18/22; G06F 21/552; G06F 2221/2119; G06F 21/55
See application file for complete search history.

(56) References Cited

U.S. PATENT DOCUMENTS

2008/0172741 A1 7/2008 Reumann et al.
2009/0094677 A1 4/2009 Pietraszek et al.
(Continued)

FOREIGN PATENT DOCUMENTS

| JP | 2006-106928 A | 4/2006 |
|----|---------------|--------|
| JP | 2009-521047 A | 5/2009 |
| WO | 2017/162997 A1 | 9/2017 |

OTHER PUBLICATIONS

Onstwist, "Domain Name Permutation Engine for Detecting Homograph Phishing Attacks, Typo Squatting, and Brand Impersonation", Available Online At: https://github.com/elceef/dnstwist/, Jun. 19, 2018, pp. 1-8.
(Continued)

*Primary Examiner* — Chuong A Ngo
(74) *Attorney, Agent, or Firm* — XSENSUS LLP

(57) ABSTRACT

An analysis device includes an input unit that receives input of communication destination information to be analyzed, a conversion unit that converts a partial character string included in the communication destination information into an image, a search unit that obtains a character string that is visually similar to an image converted by the conversion unit and searches for known communication destination information that is visually similar to the communication destination information based on the character string obtained, and an output unit that outputs a combination of the communication destination information and the known communication destination information that is visually similar to the communication destination information.

6 Claims, 8 Drawing Sheets

(56) References Cited

U.S. PATENT DOCUMENTS

| | | | |
|---|---|---|---|
| 2012/0317098 A1* | 12/2012 | Okato | ................... G06F 16/31 707/E17.014 |
| 2013/0226563 A1* | 8/2013 | Hirate | .................. G06F 40/247 704/9 |
| 2017/0308688 A1* | 10/2017 | Orihara | ................... G06F 21/55 |
| 2018/0027013 A1 | 1/2018 | Wright et al. | |

OTHER PUBLICATIONS

Woodbridge, Jonathan et al.: "Detecting Homoglyph Attacks with a Siamese Neural Network", 2018 IEEE Security and Privacy Workshops (SPW), IEEE, May 24, 2018, pp. 22-28, XP033379528, DOI: 10.1109/SPW.2018.00012 [retrieved on Aug. 2, 2018].
Extended European Search Report dated Feb. 11, 2022, in corresponding European Patent Application No. 19840304.0.

* cited by examiner

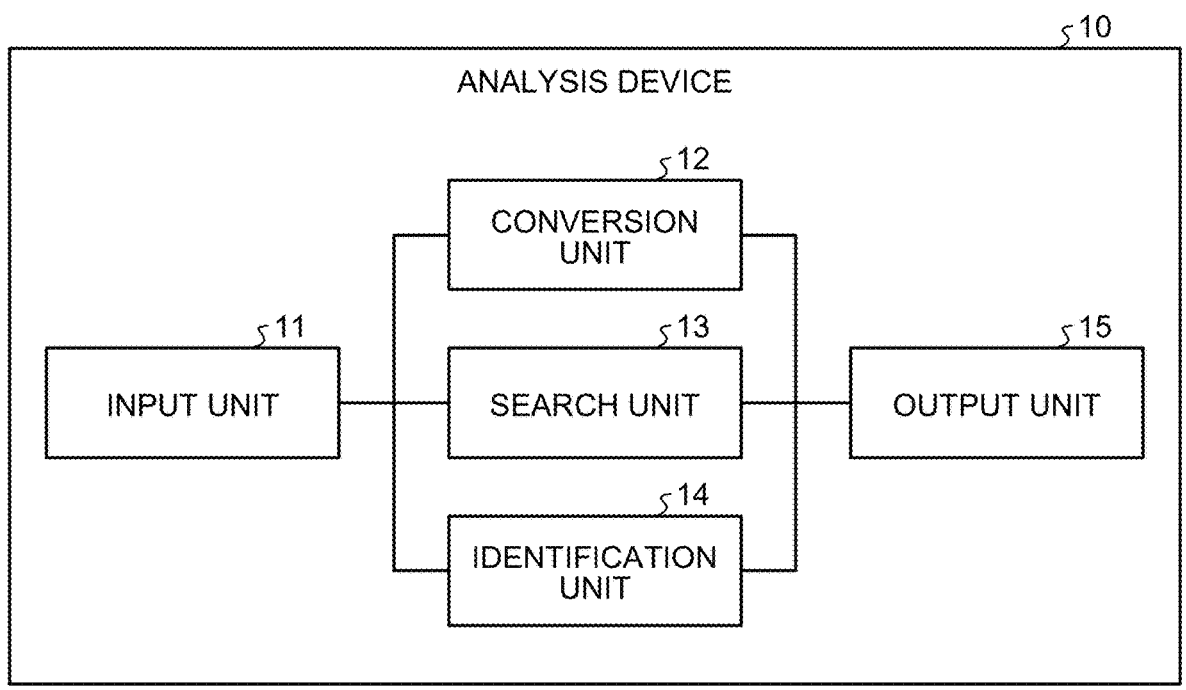

FIG.3
| SERIAL NUMBER | INPUT COMMUNICATION DESTINATION | PARTIAL CHARACTER STRING(IMAGE) |
|---|---|---|
| 1 | examp1e.co.jp | examp1e |
| 2 | ëxample.com | ëxample |
| ... | ... | ... |
FIG.4A
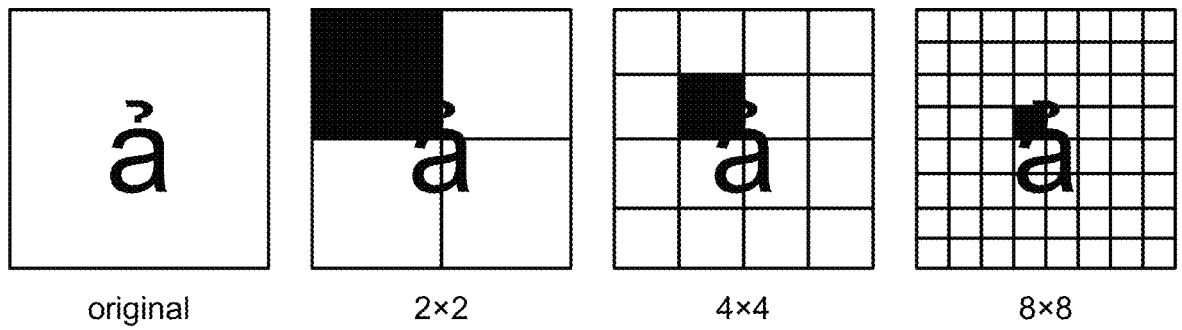
original     2×2     4×4     8×8
FIG.4B
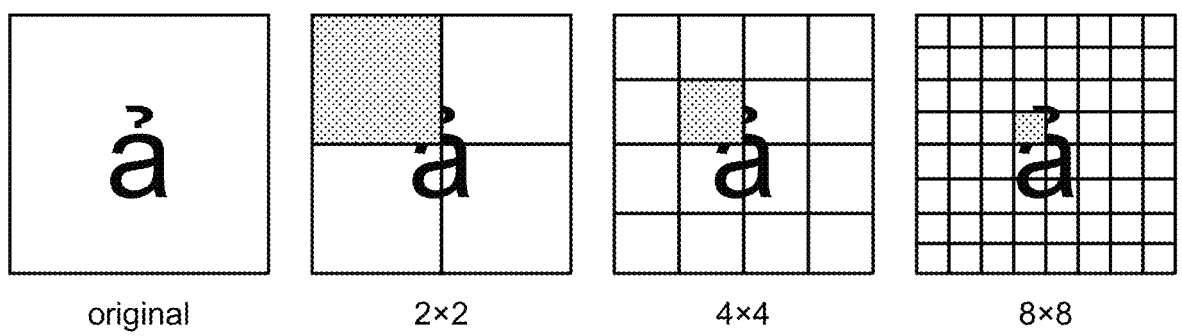
original     2×2     4×4     8×8

FIG.5

| SERIAL NUM-BER | INPUT COMMUNICATION DESTINATION | PARTIAL CHARACTER STRING(IMAGE) | RESULT OF READING AND RECOGNIZING PARTIAL CHARACTER STRING |
|---|---|---|---|
| 1 | examp1e.co.jp | examp1e | example, examp1e, ⋯ |
| 2 | ëxample.com | ëxample | example, ëxample, ⋯ |
| … | … | … | … |

| SERIAL NUMBER | ORIGINAL CHARACTER OR CHARACTER STRING | SIMILAR CHARACTER OR CHARACTER STRING |
|---|---|---|
| 1 | 1 | l |
| 2 | l | 1 |
| 3 | Ë | e |
| 4 | Ë | Ë |
| 5 | examp1e | example |
| 6 | example | examp1e |
| 7 | ëxample | example |
| 8 | ëxample | ëxample |
| … | … | … |

FIG.7

| SERIAL NUMBER | KNOWN COMMUNICATION DESTINATION |
|---|---|
| 1 | example.co.jp |
| 2 | example.com |
| ... | ... |

| SERIAL NUMBER | INPUT COMMUNICATION DESTINATION | KNOWN COMMUNICATION DESTINATION |
|---|---|---|
| 1 | examp1e.co.jp | example.co.jp |
| 2 | ë xample.com | example.com |
| ... | ... | ... |

FIG.9

| SE-RIAL NUM-BER | COMMUNI-CATION DESTINATION | A RECORD | NS RECORD | SOA RECORD |
|---|---|---|---|---|
| 1 | example.co.jp | 192.0.2.2 | ns1.example.co.jp | ns1.example.co.jp. nobody.localhost. 42 86400 43200 604800 10800 |
| 2 | example.co.jp | 192.0.2.2 | ns1.example.co.jp | ns1.example.co.jp. nobody.localhost. 42 86400 43200 604800 10800 |
| 3 | ëxample.com | 198.51.100.100 | ns.ëxample.com | ns.ëxample.com. nobody.localhost. 42 86400 43200 604800 10800 |
| 4 | example.com | 203.0.113.113 | ns1.example.com | ns1.example.com. nobody.localhost. 42 86400 43200 604800 10800 |
| ⋮ | ⋮ | ⋮ | ⋮ | ⋮ |

FIG.10

| SE-RIAL NUM-BER | COMMUNI-CATION DESTINATION | DOMAIN NAME REGISTRANT | DOMAIN NAME REGISTRATION DATE | DOMAIN NAME UPDATE DATE | DOMAIN NAME EXPIRE DATE | ... |
|---|---|---|---|---|---|---|
| 1 | examp1e.co.jp | Example Company | JANUARY 1, 2001 | JANUARY 1, 2016 | JANUARY 1, 2017 | ... |
| 2 | example.co.jp | Example Company | JANUARY 1, 2001 | JANUARY 1, 2016 | JANUARY 1, 2017 | ... |
| 3 | ëxample.com | John Smith | APRIL 1, 2017 | APRIL 1, 2018 | APRIL 1, 2019 | ... |
| 4 | example.com | Example Company | JANUARY 1, 2001 | JANUARY 1, 2016 | JANUARY 1, 2017 | ... |
| ... | ... | ... | ... | ... | ... | ... |

| SERIAL NUM-BER | INPUT COMMUNICATION DESTINATION | KNOWN COMMUNICATION DESTINATION | MANAGER OF INPUT COMMUNICATION DESTINATION IS SAME AS MANAGER OF KNOWN COMMUNICATION DESTINATION |
|---|---|---|---|
| 1 | examp1e.co.jp | example.co.jp | Yes |
| 2 | ëxample.com | example.com | No |
| ... | ... | ... | ... |

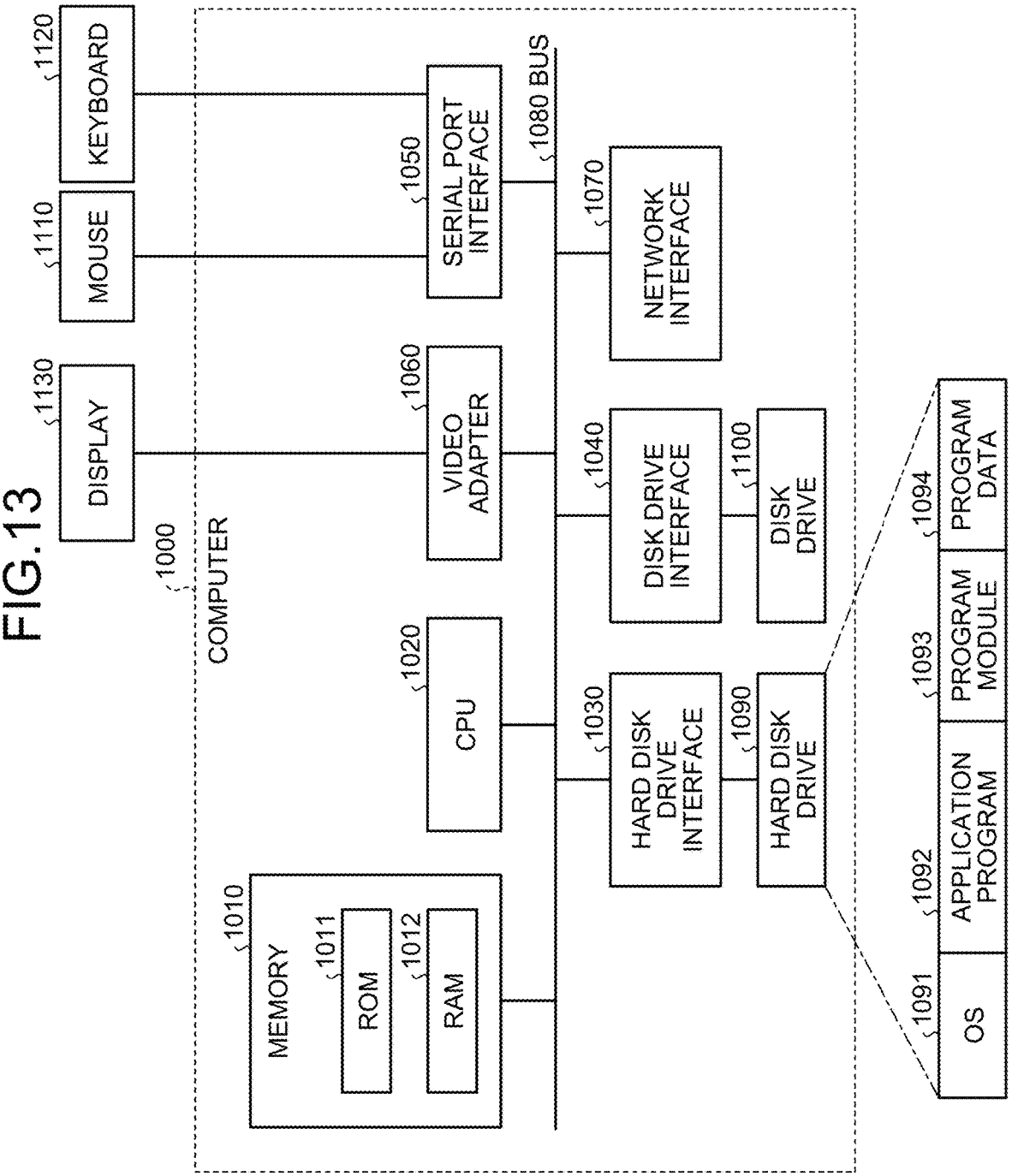

ANALYSIS DEVICE, ANALYSIS METHOD, AND ANALYSIS PROGRAM

CROSS-REFERENCE TO RELATED APPLICATIONS

The present application is based on PCT filing PCT/JP2019/018132, filed Apr. 26, 2019, which claims priority to JP 2018 139082, filed Jul. 25, 2018, the entire contents of each are incorporated herein by reference.

FIELD

The present invention relates to an analysis device, an analysis method, and an analysis program.

BACKGROUND

Domain names are now widely used around the world as part of websites or email addresses. Domain names have originally introduced to convert internet protocol (IP) addresses into character strings easily understood by humans, and in most cases, normally include service names.

Cyber attackers exploit characteristics of these domain names to perform attacks using domain names similar to domain names used for legitimate services. There are roughly two types of such malicious domain names that target legitimate services.

One is an attack called typosquatting that relies on typos made by humans. In this attack, characters close to each other on a keyboard layout are replaced or inserted in the domain names of legitimate sites for the purpose of creating similar domain names.

Another is an attack called a homograph attack that relies on human visual misjudgments. In this attack, parts of the domain names of legitimate sites are replaced by visually similar characters for the purpose of creating similar domain names.

The domain name generated in this homograph attack is called a homograph domain name. Since the introduction of internationalized domain name (IDN), it has become possible to use characters included in Unicode for domain names. Consequently, the homograph attack can create much more domain names similar to legitimate domain names than typosquatting. In addition, internationalized domain names created by homograph attacks (homograph IDNs) are actually used for cyberattacks such as phishing and thus have become significant threats.

CITATION LIST

Non Patent Literature

Non Patent Literature 1: dnstwist, [online], [Search on Jun. 19, 2018], Internet <URL: https://github.com/elceef/dnstwist/>

SUMMARY

Technical Problem

As a method of detecting a homograph IDN, there has been provided a method of using combinations of visually similar characters, which are made in advance, as a conversion table. Sets of non-ASCII characters and ASCII characters similar to these non-ASCII characters are registered in the conversion table. In using the conversion table, non-ASCII characters in a target domain name are converted into ASCII characters based on the information in the conversion table. Further, in the method using the conversion table, whether or not the converted domain name matches the domain name of a legitimate site is checked to determine whether the target domain name is a homograph IDN.

Specifically, the software described in Non-Patent Literature 1 is used to search for malicious domain names used in attacks that rely on the similarity of domain names. The conversion table of ASCII characters and visually similar character strings is defined in advance in the software.

By reversely using the conversion table to convert non-ASCII character strings included in the target domain name into ASCII character strings, it is possible to determine whether or not the converted domain name matches the domain name of a legitimate site.

However, the method of using a conversion table, which is described in Non-Patent Literature 1, cannot convert characters that are not registered in the conversion table defined in advance. Moreover, in the method of using a conversion table, which is described in Non-Patent Literature 1, when Unicode characters or characters available for domain names are added, combinations of similar characters need to be thoroughly specified and the conversion table needs to be manually updated.

The present invention has been made in view of the above circumstances, and an object of the invention is to provide an analysis device, an analysis method, and an analysis program that can automatically generate communication destination information that is visually similar to communication destination information to be analyzed without preparing a conversion table in advance.

Solution to Problem

An analysis device includes: an input unit that receives input of communication destination information to be analyzed; a conversion unit that converts a partial character string included in the communication destination information into an image; a search unit that obtains a character string that is visually similar to an image converted by the conversion unit and searches for known communication destination information that is visually similar to the communication destination information based on the character string obtained; and an output unit that outputs a combination of the communication destination information and the known communication destination information that is visually similar to the communication destination information.

Advantageous Effects of Invention

According to the present invention, it is possible to automatically generate the communication destination information that is visually similar to the communication destination information to be analyzed without preparing the conversion table in advance.

BRIEF DESCRIPTION OF DRAWINGS

FIG. 1 is a schematic diagram illustrating a schematic configuration of an analysis device according to an embodiment.

FIG. 2 is a diagram illustrating an example of communication destination information input to an input unit illustrated in FIG. 1.

FIG. 3 is a diagram illustrating an example of a correspondence table of communication destination information to be analyzed and an image converted from a partial character string included in the communication destination information to be analyzed.

FIG. 4A is a diagram for explaining the processing content of preprocessing performed by a conversion unit illustrated in FIG. 1.

FIG. 4B is a diagram for explaining the processing content of preprocessing performed by the conversion unit illustrated in FIG. 1.

FIG. 5 is a diagram illustrating an example of character strings that are extracted by a search unit illustrated in FIG. 1 and are visually similar to the converted image of the partial character string.

FIG. 6 is a diagram illustrating an example of a conversion table extracted by the search unit illustrated in FIG. 1.

FIG. 7 is a diagram illustrating a known communication destination list.

FIG. 8 is a diagram illustrating an example of search results by the search unit illustrated in FIG. 1.

FIG. 9 is a diagram illustrating an example of setting information for the communication destination information to be analyzed.

FIG. 10 is a diagram illustrating an example of registration information for the communication destination information to be analyzed.

FIG. 13 is a diagram illustrating an example of a computer that executes a program to implement the analysis device.

DESCRIPTION OF EMBODIMENTS

Figures 11, 12:
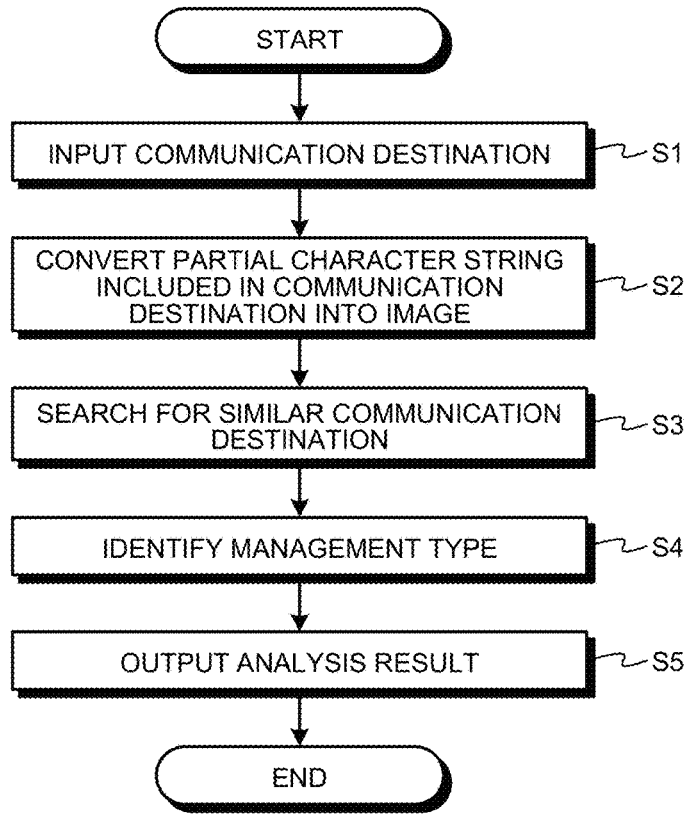
FIG. 11 is a diagram illustrating identification results by an identification unit illustrated in FIG. 1.
FIG. 12 is a flowchart illustrating a processing procedure of analysis processing according to the embodiment.

Hereinafter, an embodiment of the present invention will be described in detail with reference to the drawings. The present invention is not limited to the embodiment. In the description of the drawings, like reference numerals are used to designate like parts.

EMBODIMENT

The schematic configuration, flow of evaluation processing, and specific example of an analysis device according to an embodiment will be described first. FIG. 1 is a schematic diagram illustrating a schematic configuration of the analysis device according to the embodiment. An analysis device 10 according to the embodiment is implemented by causing a computer including a read only memory (ROM), a random access memory (RAM), a central processing unit (CPU), and the like to read a predetermined program and causing the CPU to execute the predetermined program. In addition, the analysis device 10 includes a network interface card (NIC) or the like to be able to communicate with other devices via a telecommunications line such as local area network (LAN) or the Internet.

As illustrated in FIG. 1, the analysis device 10 includes an input unit 11, a conversion unit 12, a search unit 13, an identification unit 14, and an output unit 15.

The input unit 11 receives input of the communication destination information to be analyzed. The communication destination information is, for example, information indicating a domain name or a uniform resource locator (URL).

The conversion unit 12 converts a partial character string included in communication destination information to be analyzed into an image. The conversion unit 12 specifies a region that can be registered or specified from the communication destination information to be analyzed. The conversion unit 12 then splits the partial character string in the specified region at an arbitrary delimiter or at every arbitrary number of characters, and converts each of the split character strings into an image.

The search unit 13 obtains a character string that is visually similar to the image converted by the conversion unit 12, and based on the obtained character string, searches for known communication destination information that is visually similar to the communication destination information to be analyzed.

The search unit 13 applies an image recognition technique such as optical character recognition to the image converted by the conversion unit 12 to obtain a character string that is visually similar to the image of the split character or character string. The search unit 13 extracts, as a conversion table, a combination of the partial character string included in the communication destination information to be analyzed and the character string that is visually similar to the converted image of the partial character string. The search unit 13 refers to the conversion table and a list of known communication destination information to search for communication destination information that is visually similar to the communication destination information to be analyzed in the list of known communication destination information.

The identification unit 14 acquires setting information or registration information of the known communication destination information that is visually similar to the communication destination information to be analyzed to identify whether the known communication destination information that is visually similar to the communication destination information to be analyzed is managed by the same manager as that of the communication destination information to be analyzed or by a third party different from the manager of the communication destination information to be analyzed.

The output unit 15 outputs a combination of the communication destination information to be analyzed and the known communication destination information that is visually similar to the communication destination information to be analyzed. The output unit 15 outputs the combination of the communication destination information to be analyzed and the known communication destination information that is visually similar to the communication destination information to be analyzed, together with the identification result by the identification unit 14.

As described above, the analysis device 10 converts the partial character string included in the communication destination information to be analyzed into an image and extracts a character string using the image recognition technique, thus automatically generating the communication destination information that is visually similar to the communication destination information to be analyzed without preparing a conversion table in advance. Next, processing of each component in the analysis device 10 will be specifically described.

[Input Unit]

An example of communication destination information to be analyzed that is input to the input unit 11 will be described first. FIG. 2 is a diagram illustrating an example of the communication destination information that is input to the input unit 11 illustrated in FIG. 1.

For example, the serial number "1" in FIG. 1 indicates that the domain name "example.co.jp" (numeric character "1" is used in word "example" instead of English lowercase letter "1"), which is used for homograph attacks, is used as an input.

[Conversion Unit]

Next, processing of the conversion unit 12 will be described. First, the conversion unit 12 specifies a region that can be registered or specified by a user from communication destination information to be analyzed. One of specification methods is a method of referring to Public Suffix (see, for example, Public Suffix List, [online], [searched on Jun. 19, 2018], Internet <URL: https://publicsuffix.org/list/>).

Public Suffix is a partial character string of a domain name that cannot be controlled by an individual user. Public Suffix is composed of character strings including a gTLD (generic top level domain) such as ".com" or ".net" and a ccTLD (country code top level domain) such as ".co.jp" or ".co.uk". The conversion unit 12 removes a portion corresponding to the Public Suffix from the communication destination information to be analyzed to specify the region that can be registered or specified by the user. The conversion unit 12 then splits the partial character string in the region specified as described above at an arbitrary delimiter or at every arbitrary number of characters.

FIG. 3 is a diagram illustrating an example of a correspondence table of communication destination information to be analyzed and an image converted from a partial character string included in the communication destination information to be analyzed. For example, the conversion unit 12 specifies the partial character string "example" with the Public Suffix ".co.jp" removed from the communication destination information "example.co.jp" denoted by the serial number "1" in FIG. 3 as an example of an image conversion target.

Next, preprocessing performed by the conversion unit 12 will be described. FIGS. 4A and 4B are diagrams for explaining the processing content of the preprocessing performed by the conversion unit 12 illustrated in FIG. 1. FIGS. 4A and 4B describe, as an example, preprocessing at the time of performing image conversion on a target character in which "" is attached above "a".

The conversion unit 12 uses the image recognition technique such as optical character recognition in order to specify a character in a domain name used for homograph attacks that an attacker intends to imitate. For example, when reading the target character ("" is attached above "a") in FIGS. 4A and 4B by optical character recognition, it is expected that the target character is converted into "a". However, in the case of high accuracy optical character recognition, the expected result of reading may not be obtained because the target character is different from "a" in shape.

In the present embodiment, an image in which the character shape is changed by filling a part of the image with black is intentionally prepared in order to obtain various results of reading. Hereinafter, this image is referred to as "mask image". FIGS. 4A and 4B illustrate an example of preparing two colors, black and white to fill a certain character with the mask image. The mask image is not limited to two colors, black and white.

As a part of a character is deleted when the mask image is white or as noise is added when the mask image is black, the result of reading is affected as compared with an image with no mask applied. FIG. 4A illustrates, as a method of arranging a mask image, an example in which the created image is divided into 2×2, 4×4, and 8×8 squares, and any one of these squares is filled with a black mask image. FIG. 4B illustrates, as the method of arranging a mask image, an example in which the created image is divided into 2×2, 4×4, and 8×8 squares, and any one of these squares is filled with a white mask image. The image division method is not limited these patterns. In addition, the number of portions filled with the mask image is not limited to one, and arbitrary N portions with a plurality of color combinations may be specified.

In the example of FIGS. 4A and 4B, in total, 169 types of character images are finally created, that is, for a character, if 84 types of mask locations are provided for two types of colors (black and white), that works out 168 types of mask images and an image with no mask applied is added to these mask images. In FIG. 4B, a white mask is represented by dot hatching and lines of divided squares are added for the sake of representation.

A series of mask processing is performed in order to intentionally misread a visually similar character string in subsequent image recognition processing. For example, in the mask processing, various masks may be prepared so as to obtain the result that the character with "" at the top of "a" that an attacker intends to imitate "a" is misread as "a".

As the series of mask processing is performed as described above, various results of reading are obtained when each split character string is converted into an image, so that the conversion table extracted by the search unit 13 can include a large number of combinations of character strings that are visually similar to the image.

[Search Unit]

Next, processing of the search unit 13 will be described. First, the search unit 13 applies an image recognition technique such as optical character recognition to images converted by the conversion unit 12 to obtain character strings that are visually similar to these images. The visually similar character string means a character string that is possibly determined to be identical based on the characteristics of character shapes or character strings in known or popular service names when a human makes recognition and determination using the sense of vision. FIG. 5 is a diagram illustrating an example of character strings that are extracted by the search unit 13 illustrated in FIG. 1 and are visually similar to the converted image of the partial character string.

In FIG. 5, the input communication destination indicates communication destination information that is input as an analysis target. The partial character string (image) indicates the image of the partial character string in the communication destination information to be analyzed, which is converted by the conversion unit 12. The result of reading and recognizing the partial character string indicates the character string that is extracted by the search unit 13 and is visually similar to the image of the partial character string.

The search unit 13 reads the image of the partial character string extracted from the communication destination information to be analyzed using the image recognition technique to recognize a character string that is visually similar to the image of the partial character string. The search unit 13 uses, as an example of the image recognition technique, Tesseract OCR that is open source software in which the optical character recognition technique is implemented (see, for example, Tesseract OCR, [online], [Search on Jun. 19, 2018], Internet <URL: https://opensource.google.com/projects/tesseract/>).

A description will be given by using the serial number "1" in FIG. 5 as an example. In this case, the conversion unit 12 performs preprocessing on the image of the partial character string "example" by using the mask images described with reference to FIGS. 4A and 4B. The search unit 13 outputs, as a result, the character string "example" in which "1" is recognized as the number "1" as it is. Alternately, the search unit 13 outputs, as a result, the character string "example" in which "1" is recognized as the English lowercase letter "l".

The search unit 13 then extracts, as a conversion table, a combination of the partial character string included in the communication destination information to be analyzed and the character string that is visually similar to the converted image of the partial character string. FIG. 6 is a diagram illustrating an example of a conversion table extracted by the search unit 13 illustrated in FIG. 1. As illustrated in FIG. 6, the partial character string (original character or character string) included in the communication destination information to be analyzed corresponds to the character string (similar character or character string) that is visually similar to the converted image of the partial character string in a conversion table 131.

For example, in the case of the serial number "1" in FIG. 6, the search unit 13 makes "l (English lowercase letter)" correspond to "1 (numeric character)" as a similar character. In the present embodiment, the search unit 13 automatically outputs the conversion table in which the partial character string included in the communication destination information to be analyzed corresponds to the character string that is visually similar to the partial character string. According to the present embodiment, since the search unit 13 automatically outputs the conversion table, it is possible to search for communication destination information that is visually similar to communication destination information to be analyzed without preparing the conversion table in advance.

As a result of applying a plurality of masks to an image, a plurality of visually similar character strings may be output for a single character string of the communication destination information to be analyzed. In this case, the single character string of the communication destination information to be analyzed can correspond to results of reading whose number is equal to the number of the masks in the conversion table. However, in most cases, the results of reading for the masks are actually the same, and thus the combination that is already present in the conversion table is not included in the conversion table.

Search processing of the search unit 13 will be described below. First, a list of known communication destination information (known communication destination list) that is referred to by the search unit 13 will be described. FIG. 7 is a diagram illustrating a known communication destination list. In a known communication destination list 132 illustrated in FIG. 7, a serial number is attached to each of the known communication destination information (known communication destinations).

The known communication destination list 132 is created in advance and stored in the analysis device 10. There are a plurality of methods to create the list of known communication destination information. For example, all or part of the communication destination information managed by a user of the analysis device 10 is created as the known communication destination list. Alternatively, all or part of the communication destination information used on websites frequently visited in the world or countries is created as the known communication destination list.

The search unit 13 refers to the conversion table 131 (see FIG. 6) and the known communication destination list 132 to search for communication destination information that is visually similar to the communication destination information to be analyzed in the known communication destination list.

FIG. 8 is a diagram illustrating an example of search results by the search unit 13 illustrated in FIG. 1. As illustrated in FIG. 8, the search unit 13 makes the communication destination information to be analyzed (input communication destination) correspond to the known communication destination information (known communication destination) that is visually similar to the communication destination information to be analyzed and outputs them.

A description will be given by using the serial number "1" in FIG. 8 as an example. In this case, for the character string "1" included in the input communication destination "example.co.jp", the search unit 13 refers to the matching similar character "l (English lowercase letter)" indicated by the serial number "5" and the matching similar character "1 (numeric character)" indicated by the serial number "6" in the conversion table 131 (see FIG. 6) to obtain "example-.co.jp" and "example.co.jp" as similar communication destinations.

The search unit 13 then searches for these similar communication destinations in the known communication destination list 132 (see FIG. 7). The known communication destination list 132 includes the similar communication destination "example.co.jp" (see serial number "1"). Consequently, the search unit 13 outputs "example.co.jp" as the known communication destination information that is similar to the input communication destination "example.co.jp".

As described above, the search unit 13 searches for the communication destination information that is visually similar to the communication destination information to be analyzed based on a combination of a partial character string described in a conversion table and a character string that is visually similar to a converted image of the partial character string to extract only the known communication destination information among the similar communication destination information searched.

[Identification Unit]

Next, processing of the identification unit 14 will be described. The identification unit 14 acquires setting information or registration information of known communication destination information that is visually similar to communication destination information to be analyzed, based on a combination of the communication destination information to be analyzed and the known communication destination information that is visually similar to the communication destination information to be analyzed.

FIG. 9 is a diagram illustrating an example of setting information for communication destination information to be analyzed. As illustrated in FIG. 9, the identification unit 14 acquires, among the communication destination information to be analyzed, for example, an A record, an NS (Name Server record) record, an SOA (Start Of Authority record) record, and the like, which are setting information for a domain name, as setting information and management information. The A (Address) record, the NS record, and the SOA record can be obtained with the DNS protocol on a cache domain name system (DNS) server installed in an arbitrary intranet.

For example, in the case of the serial number "1" in FIG. 9, the IP address "192.0.2.2" is set as the A record, "ns1.example.co.jp" is set as the NS record, and "ns1.example.co.jp.nobody.localhost. 42 86400 43200 604800 10800" is set as the SOA record in the communication destination information to be analyzed (communication destination) "example.co.jp".

FIG. 10 is a diagram illustrating an example of registration information for communication destination information to be analyzed. Among the communication destination information to be analyzed, the identification unit 14 can obtain, for example, a domain name registrant, a domain name registration date, a domain name update date, a domain name expire date, and the like, which are registration information for a domain name, with the WHOIS protocol, for example. For example, in the case of the serial number "1" in FIG. 10, for the communication destination "example.co.jp", the domain name registrant is "Example Company", the domain name registration date is "Jan. 1, 2001", the domain name update date is "Jan. 1, 2016", and the domain name expire date is "Jan. 1, 2017".

The identification unit 14 then identifies whether the known communication destination information that is visually similar to the communication destination information to be analyzed is managed by the same manager as that of the communication destination information to be analyzed or by a third party that is different from the manager of the communication destination information to be analyzed, based on the acquired setting information or registration information of the known communication destination information that is visually similar to the communication destination information to be analyzed. FIG. 11 is a diagram illustrating identification results by the identification unit 14 illustrated in FIG. 1.

For example, a description will be given of the case of the serial number "1" in a recognition result list 141 illustrated in FIG. 11, that is, the case where "example.co.jp" is specified as the known communication destination that is similar to the communication destination "example.co.jp". In this case, the identification unit 14 refers to the setting information of the communication destination illustrated in FIG. 9 and the registration information of the communication destination illustrated in FIG. 10. When the A record, NS record, and SOA record of the input communication destination "example.co.jp" perfectly match those of the known communication destination "example.co.jp" and their domain name registrants also match perfectly as a result of the reference, the identification unit 14 identifies that the known communication destination information that is visually similar to the communication destination information to be analyzed is managed by the same manager as that of the communication destination information to be analyzed. The identification unit 14 then attaches "Yes" to the combination of the communication destination information to be analyzed and the known communication destination information that is visually similar to the communication destination information to be analyzed.

On the other hand, when the identification unit 14 identifies that the known communication destination information is managed by a third party that is different from the manager of the communication destination information to be analyzed, the identification unit 14 attaches "No" to the combination of the communication destination information to be analyzed and the known communication destination information that is visually similar to the communication destination information to be analyzed. A plurality of conditions for identifying the same manager are considered, and it is assumed to use the number of perfect or partial matches of all, part, or a combination of the setting information and the registration information for each communication destination.

The output unit 15 outputs an analysis result list 141 in which the identification result by the identification unit 14 is added to the combination of the communication destination information to be analyzed and the known communication destination information that is visually similar to the communication destination information to be analyzed to, for example, a user of the analysis device 10 or an external processing device. Various processing is performed using the analysis result list 141.

For example, when it is identified that the known communication destination information that is visually similar to the communication destination information to be analyzed is managed by the same manager as that of the communication destination information to be analyzed, and the known communication destination information that is visually similar to the communication destination information to be analyzed is managed by an attacker, the communication destination information to be analyzed is registered in a black list and its reception is avoided thereafter. Alternatively, when the known communication destination information that is visually similar to the communication destination information to be analyzed is managed by a third party that is different from the manager of the communication destination information to be analyzed, and the known communication destination information that is visually similar to the communication destination information to be analyzed is managed by the user of the analysis device 10, for example, for the purpose of enhancing brand value, the procedure for preemption is taken to prevent other parties from monopolizing the known communication destination information that is visually similar to the communication destination information to be analyzed.

[Processing Procedure of Analysis Processing]

Next, the processing procedure of analysis processing performed by the analysis device 10 will be described. FIG. 12 is a flowchart illustrating a processing procedure of analysis processing according to the embodiment.

As illustrated in FIG. 12, when the input unit 11 receives input of communication destination information to be analyzed (communication destination) (step S1), the conversion unit 12 converts a partial character string included in the communication destination information to be analyzed into an image (step S2).

Next, the search unit 13 obtains a character string that is visually similar to the image converted by the conversion unit 12, and searches for known communication destination information that is visually similar to the communication destination information to be analyzed based on the obtained character string (step S3).

The identification unit 14 then acquires setting information or registration information of the known communication destination information that is visually similar to the communication destination information to be analyzed, and identifies whether the known communication destination information that is visually similar to the communication destination information to be analyzed is managed by the same manager as that of the communication destination information to be analyzed or by a third party that is different from the manager of the communication destination information to be analyzed (step S4).

The output unit 15 outputs a combination of the communication destination information to be analyzed and the known communication destination information that is visually similar to the communication destination information to be analyzed, together with the identification result by the identification unit 14 (step S5).

Effects of Embodiment

As described above, the analysis device 10 according to the present embodiment receives input of communication destination information to be analyzed and then converts a partial character string included in the communication destination information into an image. The analysis device 10 then obtains a character string that is visually similar to the converted image, searches for known communication destination information that is visually similar to the communication destination information based on the obtained character string, and outputs a combination of the destination information and the known communication destination information that is visually similar to the communication destination information. Consequently, for the communication destination to be analyzed, the analysis device 10 can automatically generate the communication destination information that is visually similar to the communication destination information to be analyzed without preparing a conversion table of similar character strings in advance.

The analysis device 10 specifies a region that can be registered or specified from the communication destination information to be analyzed, splits the partial character string in the specified region at an arbitrary delimiter or at every arbitrary number of characters, and converts each of the split character strings into an image. As the analysis device 10 specifies the region where an attacker can set a visually similar character string from the communication destination information to be analyzed, the communication destination information that is visually similar to the communication destination information to be analyzed can be extracted more accurately.

The analysis device 10 applies optical character recognition to the converted image to obtain a character string that is visually similar to the image, and extracts, as a conversion table, a combination of the partial character string included in the communication destination information to be analyzed and the character string that is visually similar to the converted image of the partial character string. Consequently, the analysis device 10 can automatically extract an appropriate conversion table during processing without preparing a conversion table of similar character strings in advance.

The analysis device 10 refers to the conversion table and a list of known communication destination information to search for communication destination information that is visually similar to the communication destination information to be analyzed in the list of known communication destination information. The analysis device 10 can thus appropriately search for candidates for the communication destination information that is visually similar to the communication destination information to be analyzed. Consequently, the analysis device 10 can specify which legitimate communication destinations or services are targeted for the communication destination information to be analyzed among communication destination information in which the communication destination to be analyzed is already present.

The analysis device 10 acquires setting information or registration information of the known communication destination information that is visually similar to the communication destination information based on a combination of the communication destination information and the known communication destination information that is visually similar to the communication destination information. Further, the analysis device 10 identifies whether the known communication destination information that is visually similar to the communication destination information is managed by the same manager as that of the communication destination information or by a third party that is different from the manager of the communication destination information.

Consequently, based on the analysis result of the analysis device 10, it is possible to specify a legitimate communication destination that the communication destination information to be analyzed is intended to imitate, or specify whether the communication destination information to be analyzed is generated for cyberattacks. For example, it is possible to specify using the analysis result whether the communication destination information to be analyzed is generated for cyberattacks such as phishing.

[System Configuration of Embodiment]

The components of the analysis device 10 illustrated in FIG. 1 are conceptual in function, and need not to be physically configured as illustrated in FIG. 1. That is, the specific mode of distribution and integration of functions in the analysis device 10 is not limited to that illustrated in FIG. 1, and all or part of the functions may be functionally or physically distributed or integrated on a per-unit basis, depending on various loads or usage situations.

All or any part of the processing performed in the analysis device 10 may be implemented by a CPU and a program that is analyzed and executed by the CPU. The processing performed in the analysis device 10 may be implemented as hardware with wired logic.

In the processing described in the embodiment, all or part of the processing described to be automatically performed may be performed manually. Alternatively, all or part of the processing described to be performed manually may be performed automatically. The processing procedure, control procedure, specific names, and information including various data and parameters, which have been described above and illustrated in the drawings, may be changed as appropriate unless specified otherwise.

[Program]

FIG. 13 is a diagram illustrating an example of a computer that executes a program to implement the analysis device 10. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a random access memory (RAM) 1012. The ROM 1011 stores a boot program such as a basic input output system (BIOS), for example. The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to a mouse 1110 and a keyboard 1120, for example. The video adapter 1060 is connected to a display 1130, for example.

The hard disk drive 1090 stores, for example, an operating system (OS) 1091, an application program 1092, a program module 1093, and program data 1094. That is, the program that defines the processing of the analysis device 10 is implemented as the program module 1093 in which codes that can be performed by the computer 1000 are described. The program module 1093 is stored in the hard disk drive 1090, for example. For example, the program module 1093 for performing processing similar to the functional configuration of the analysis device 10 is stored in the hard disk drive 1090. The hard disk drive 1090 may be replaced with a solid state drive (SSD).

The setting data used in the processing of the embodiment described above is stored in, for example, the memory 1010 or the hard disk drive 1090 as the program data 1094. The CPU 1020 reads the program module 1093 and the program data 1094 stored in the memory 1010 and the hard disk drive 1090 into the RAM 1012 as appropriate and executes them.

The program module 1093 and the program data 1094 need not to be stored in the hard disk drive 1090, and may be stored in, for example, a removable storage medium and read by the CPU 1020 through the disk drive 1100 or the like. Alternatively, the program module 1093 and the program data 1094 may be stored in another computer connected via a network (local area network (LAN), wide area network (WAN) or the like). The program module 1093 and the program data 1094 may be read from another computer through the network interface 1070 by the CPU 1020.

The embodiment to which the invention made by the present inventor is applied has been described above, but the present invention is not limited by the description and the drawings that constitute part of the disclosure of the present invention. That is, other embodiments, examples, operational technologies, and the like that are conceived by those skilled in the art based on the present embodiment are all included in the scope of the present invention.

REFERENCE SIGNS LIST

10 ANALYSIS DEVICE
11 INPUT UNIT
12 CONVERSION UNIT
13 SEARCH UNIT
14 IDENTIFICATION UNIT
15 OUTPUT UNIT

The invention claimed is:

1. An analysis device comprising:
a memory; and
a processor coupled to the memory and programmed to execute a process comprising:
receiving input of communication destination information to be analyzed;
converting a partial character string included in the communication destination information into an image;
obtaining a character string that is visually similar to an image converted by the converting and searching for known communication destination information that is visually similar to the communication destination information based on the character string obtained; and
outputting a combination of the communication destination information and the known communication destination information that is visually similar to the communication destination information.

2. The analysis device according to claim 1, wherein the converting specifies a region that can be registered or specified from the communication destination information, splits a partial character string in a specified region at an arbitrary delimiter or at every arbitrary number of characters, and converts each of split character strings into an image.

3. The analysis device according to claim 1, wherein the searching applies optical character recognition to an image converted by the converting to obtain the character string that is visually similar to the image, extracts, as a conversion table, a combination of a partial character string included in the communication destination information to be analyzed and the character string that is visually similar to a converted image of the partial character string, refers to the conversion table and a list of known communication destination information, and searches for communication destination information that is visually similar to the communication destination information in the list of known communication destination information.

4. The analysis device according to claim 1, further comprising
acquiring setting information or registration information of known communication destination information that is visually similar to the communication destination information and identifying whether the known communication destination information that is visually similar to the communication destination information is managed by a same manager as a manager of the communication destination information or by a third party that is different from the manager of the communication destination information, wherein
the outputting outputs a combination of the communication destination information and the known communication destination information visually similar to the communication destination information together with an identification result by the identifying.

5. An analysis method performed by an analysis device, the method comprising:
a step of receiving input of communication destination information to be analyzed;
a step of converting a partial character string included in the communication destination information into an image;
a step of obtaining a character string that is visually similar to a converted image and searching for known communication destination information that is visually similar to the communication destination information based on the character string obtained; and
a step of outputting a combination of the communication destination information and the known communication destination information that is visually similar to the communication destination information.

6. A non-transitory computer-readable recording medium having stored therein an analysis program for causing a computer to execute a process comprising:
a step of receiving input of communication destination information to be analyzed;
a step of converting a partial character string included in the communication destination information into an image;
a step of obtaining a character string that is visually similar to a converted image and searching for known communication destination information that is visually similar to the communication destination information based on the character string obtained; and
a step of outputting a combination of the communication destination information and the known communication destination information that is visually similar to the communication destination information.

* * * * *